United States Patent [19]

Mead

[11] 4,302,904
[45] Dec. 1, 1981

[54] AGRICULTURAL APPLICATOR APPARATUS

[75] Inventor: Harold C. Mead, Charles City, Iowa

[73] Assignee: Nixdorff Krein Industries, Inc., St. Louis, Mo.

[21] Appl. No.: 50,652

[22] Filed: Jun. 21, 1979

[51] Int. Cl.³ ............................................ B05C 1/00
[52] U.S. Cl. ................................................. 47/1.5
[58] Field of Search ................................. 47/1.5, 1.7

[56] References Cited

U.S. PATENT DOCUMENTS

| | | | |
|---|---|---|---|
| 876,612 | 1/1908 | Watkins | 47/1.5 |
| 910,933 | 1/1909 | Mahanay | 47/1.5 |
| 1,109,060 | 9/1914 | Griffin | 47/1.5 |
| 1,527,669 | 2/1925 | Camp | 47/1.5 |
| 1,539,789 | 5/1925 | Walker | 47/1.5 |
| 1,598,628 | 9/1926 | Walker | 47/1.5 |
| 1,764,952 | 6/1930 | Hay | 47/1.5 |
| 2,029,166 | 1/1936 | Hales | 47/1.7 X |
| 2,223,809 | 12/1940 | Rucker | 47/1.5 |

FOREIGN PATENT DOCUMENTS 11263 of 1893 United Kingdom ................... 47/1.5

*Primary Examiner*—Robert E. Bagwill

*Attorney, Agent, or Firm*—Kalish & Gilster

[57] ABSTRACT

Apparatus selectively applies a sprayable treatment liquid to target vegetation. The apparatus is configured for being carried by an agricultural implement, as at the rear of a tractor, and includes support structure including a boom extending across several rows of vegetation. A plurality of wig-like applicators of flexible, absorbent textile material are carried in selectedly positionable relationship from the support structure. The applicators are adapted for physically contacting target vegetation, being positionable with respect to the individual rows. The applicators are carried in such manner that they open forwardly for receiving and partly surrounding target vegetation in the rows and for subsequently contacting foliage of the target vegetation as the tractor travels along the rows. Foliage parting aprons are optionally utilized with the applicators, being carried in front of a respective applicator for parting foliage of the target vegetation before the same is contacted by the applicator. Spray nozzles direct the treatment liquid toward each applicator for application to the foliage. The apparatus may be used to apply the liquid either to vegetation growing above a crop, as to pest vegetation, or directly to and inside the foliage of crop vegetation.

30 Claims, 11 Drawing Figures

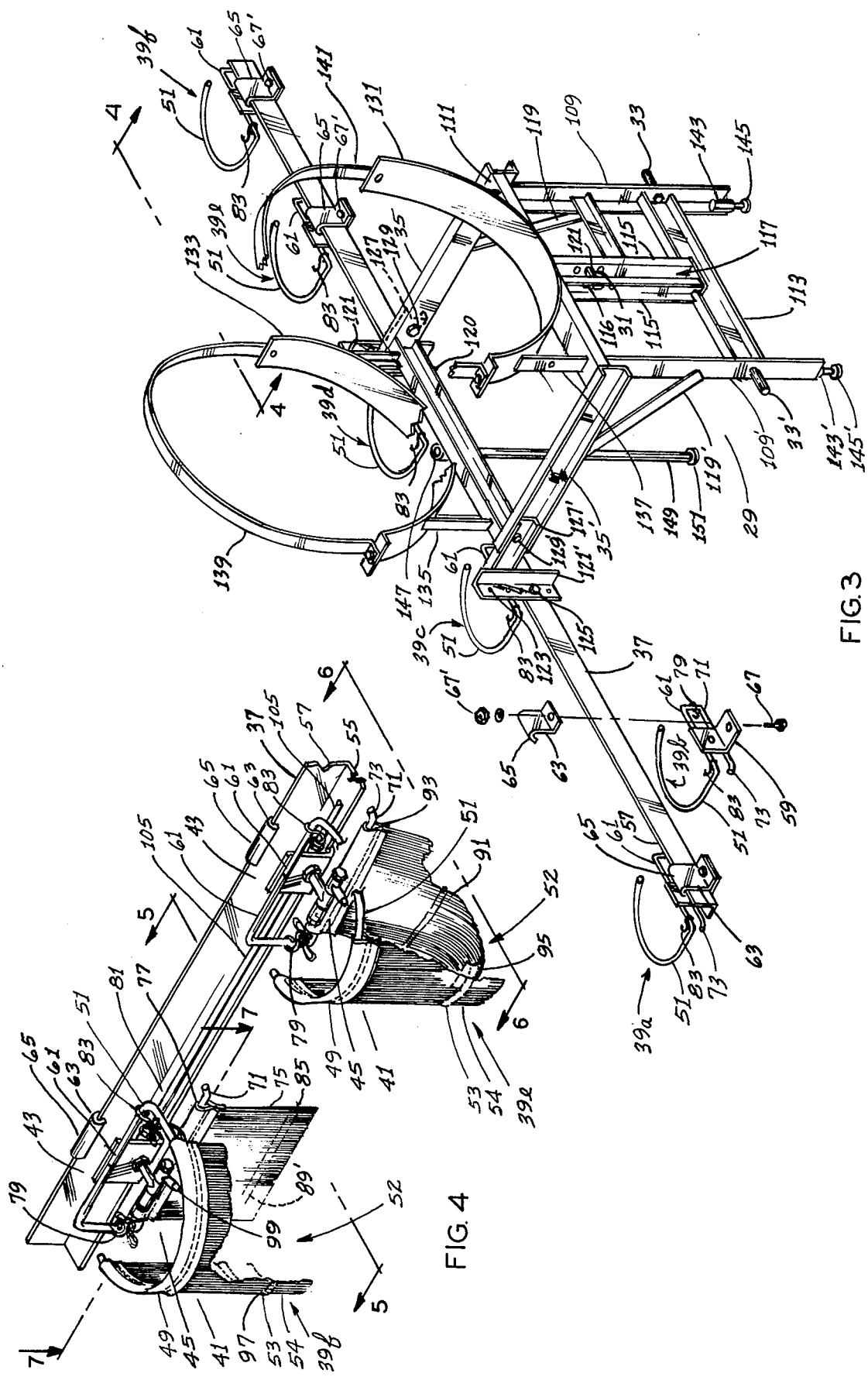

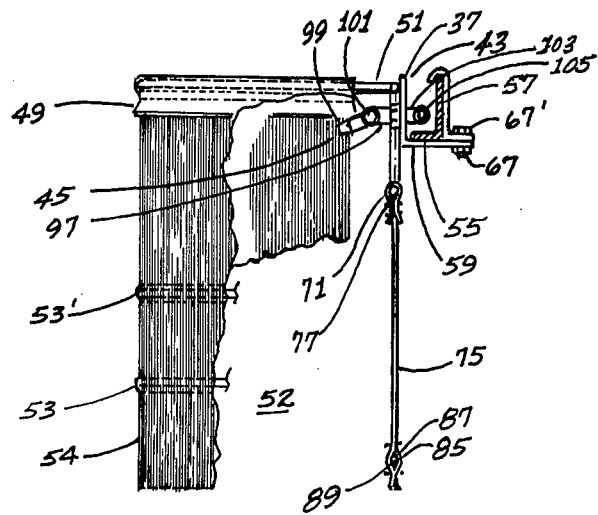
FIG. 5
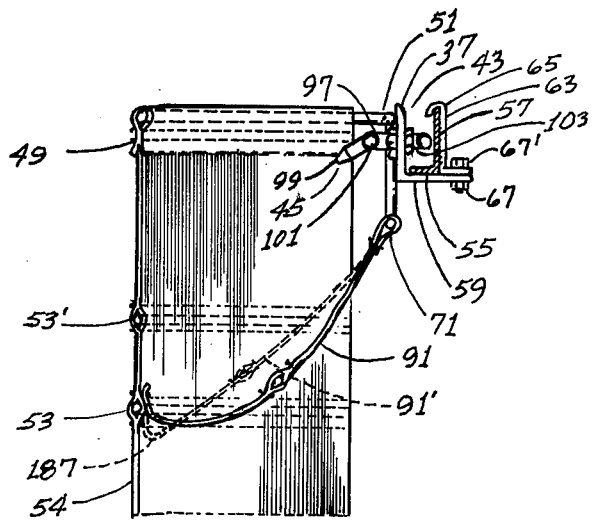
FIG. 6
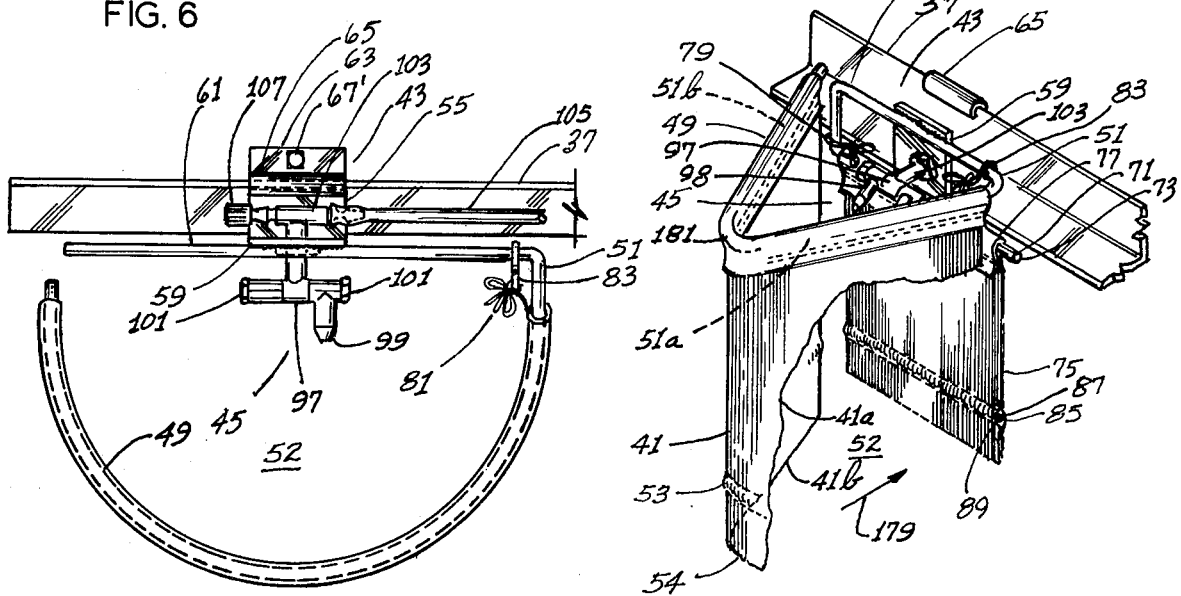
FIG. 7
FIG. 8

AGRICULTURAL APPLICATOR APPARATUS

BACKGROUND AND SUMMARY OF THE INVENTION

The present invention relates to apparatus for applying substances to vegetation for treatment thereof and, more particularly, to an applicator for providing direct, targeted application of agricultural treatment substances to foliage of target vegetation.

It has long been known to provide chemicals for treatment of vegetation in agriculture, as for treating plants affected with funguses, viruses, blights, etc., and for applying herbicides, pesticides, fungicides, plant growth regulators, trace minerals and myriad other chemical solutions, compounds and mixtures utilized in modern agriculture. Typically, such chemicals, whether of the powder or liquid form, are simply broadcast as by spraying from the nozzles of a spray boom carried behind a tractor, trailer or other vehicle, although direct application to soil has been also employed as during ground cultivation. Also, it has been known to exterminate boll weevil by merely dragging kerosene or arsenic compound laden fabric or strands across plants and, indeed, it has long been known to brush or physically daub or drench a plant for treatment purposes.

One may appreciate that indiscriminate spraying of numerous kinds of organic and inorganic compounds and mixtures for agricultural treatment purposes raises many problems due to the toxic, mutagenic or carcinogenic tendencies or characteristics of such substances. Not only stringent laws but also numerous regulations relating to the use of plant treatment substances have been and are being established and ever more rigorously administered by federal agencies. These make it increasingly undesirable to continue using the ubiquitous recirculating sprayer which, because of its inherent deficiencies, is sometimes referred to as a "dripper", "splasher" or "spitter". Because of the known and suspected risks as well as illegality of indiscriminate spraying of crops with treatment substances, it is becoming a matter of increasing criticality and importance that crop treatment substance be most selectively and carefully applied.

Accordingly, an object of the invention is the provision of an agricultural applicator apparatus for applying a sprayable agricultural treatment substance only to vegetation for which it is intended, i.e., what may be termed "target" vegetation.

It is a further object of the invention to provide such applicator apparatus which provides for direct physical contact of flexible, absorbent textile material for treatment purposes to foliage of target vegetation.

Yet another object of the invention is the provision of such applicator apparatus which is utilizable to spray treatment substances by contacting only target vegetation and not other, i.e., non-target, vegetation.

A further object of the invention is the provision of such applicator apparatus which can be used in alternative first or second modes, namely first either for applying sprayable treatment liquid directly to target vegetation standing above a crop, or second for applying such liquid directly to and inside the foliage of crop vegetation.

Another object of the invention is the provision of an agricultural applicator which enshrouds target vegetation for being sprayed while enshrouded.

A still further object of the invention is the provision of such an applicator adapted for parting foliage of the target vegetation before the same is sprayed or otherwise contacted by the absorbent textile material, a related object being the provision of such an applicator which physically turns over foliar portions of the vegetation for application of the treatment substance to increased surface areas of such foliar portions.

Another object of the invention is the provision of such applicator apparatus which is of the non-circulating type but which can positively, effectively and efficiently apply treatment substances to various different types and heights of vegetation.

Still another object of the invention is the provision of such applicator apparatus which precludes drippage of treatment liquids when employed in said first mode.

Among still other objects of the invention may be noted the provision of such applicator apparatus which applies any of numerous sprayable agricultural treatment substances, including organic and inorganic liquids, herbicides, fungicides, insecticides, foliar feeds, etc.; which applies such substances in an extremely efficacious and direct manner; which avoids spraying drift, "boiling off", and waste of expensive agricultural treatment substances; and which is utilizable to apply such substances only to target vegetation while substantially avoiding the application of such substance to other vegetation coexisting with said target vegetation.

Further objects of the invention incude the provision of such applicator apparatus which is extremely simple in construction, inexpensive in construction, is simply and easily manufactured and assembled, inexpensive in use and highly durable and effective in use.

Other objects will be in part apparent and in part pointed out hereinbelow.

BRIEF DESCRIPTION OF THE DRAWINGS

FIG. 3 is a perspective view, partly broken away, of structural elements of the applicator apparatus.

FIG. 4 is a perspective view of certain vegetation treatment assemblies of the apparatus, as viewed generally along line 4—4 of FIG. 3.

FIG. 5 is a cross-sectional view, partly broken away, of an assembly depicted in FIG. 4 and taken generally along line 5—5 thereof.

FIG. 6 is a cross-sectional view similar to FIG. 5 taken generally along line 6—6 of FIG. 4.

FIG. 7 is a vertical plan view of a vegetation treatment assembly of the type shown in FIG. 4.

FIG. 8 is a perspective view of an alternate configuration of a vegetation treatment assembly of the general type shown in FIG. 4.

Figure 1:
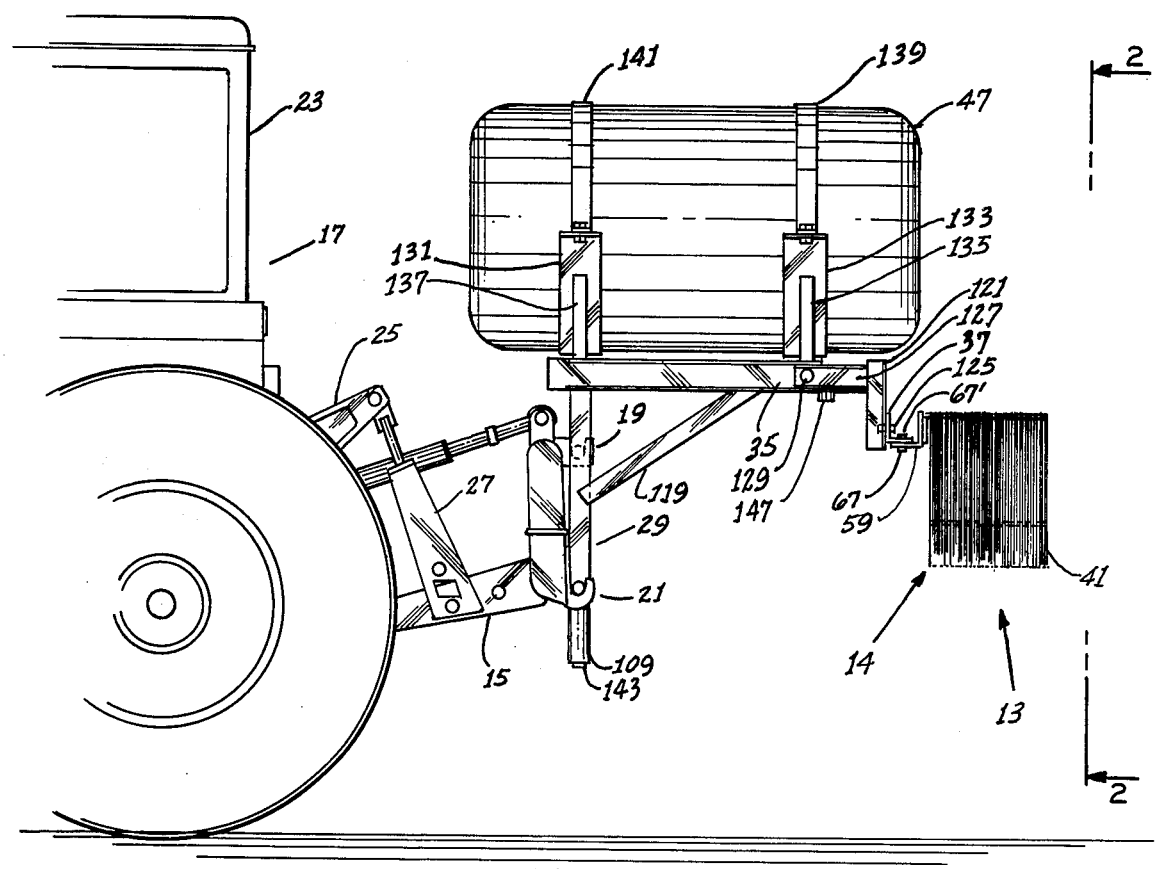
FIG. 1 is a side elevational view of applicator apparatus constructed in accordance with and embodying the present invention, as mounted upon a conventional three-point hitch of a tractor.
Figure 2:
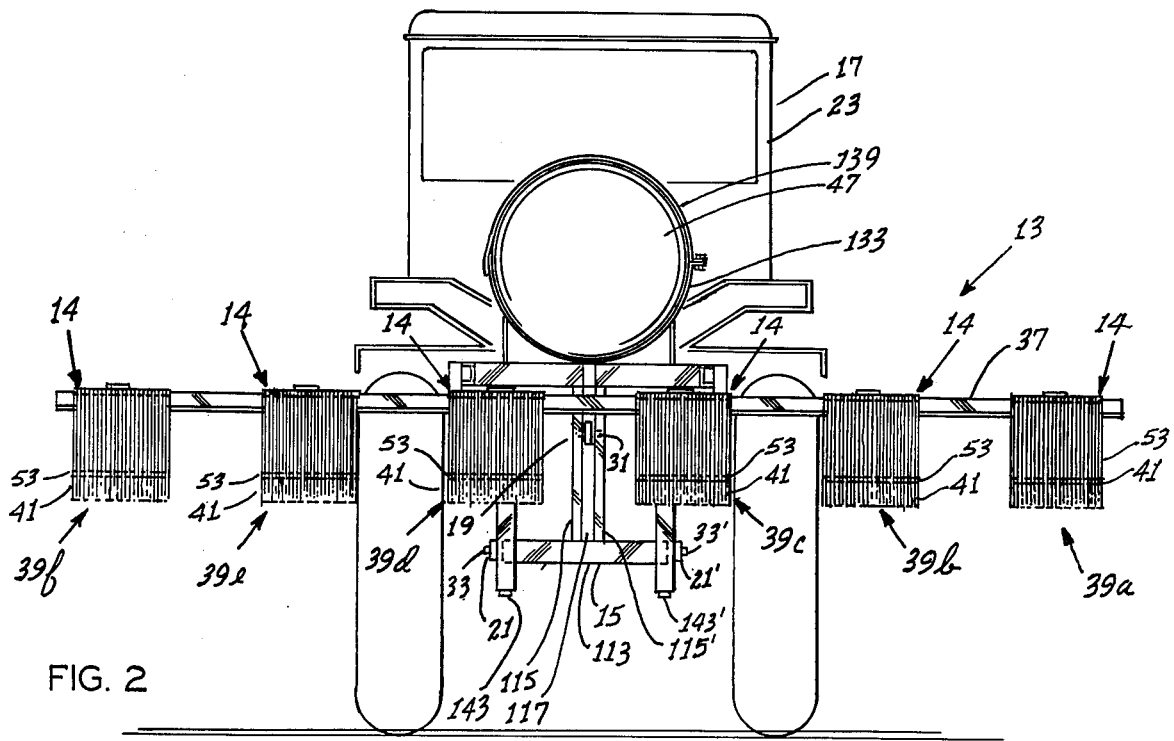
FIG. 2 is a rear elevation of the applicator apparatus as carried by said tractor.

Corresponding reference numerals indicate corresponding parts throughout the various figures of the drawings.

DESCRIPTION OF THE PREFERRED EMBODIMENT

Referring now to the drawings, and particularly to FIGS. 1 and 2, apparatus of the invention is designated generally at 13, and which makes use of a new wig-like textile applicator 14 for contacting target vegetation. The apparatus is shown configured for being carried by a conventional three-point lifting hitch designated generally 15, which hitch extends rearwardly from a tractor 17 and is of the conventional so-called "quick-hitch" which has three hook-like members 19, and 21,21', which may have remotely controlled latching mechanisms associated therewith which can be controlled from a cab 23 of tractor 17 by the operator therein for positively latching an implement such as a plow, disc harrow, planter, cultivator, etc., to hitch 15. The hitch itself is of the lift type adapted for being selectively raised or lowered with the implements carried on it by remote control from the operator position within cab 23 by means of a hydraulic lifting mechanism (not shown) through interconnection by means of lever arm 25 and link 27 of the hitch to a selected height above ground.

Apparatus 13 of the invention is utilized for selectively applying to vegetation a sprayable treatment substance such as any of numerous kinds of organic or inorganic solutions, mixutres and/or compounds for agricultural treatment purposes. But in contradistinction with other types of agricultural applicators, the new applicator 13 is intended to apply such a sprayable treatment substance only to target vegetation, rather than broadcasting or indiscriminately spraying a treatment substance over a wide area.

Characteristic of the new apparatus is its employment of wig-like absorbent textile applicators as shown at 14 to provide two primary alternative modes of use. In the first mode, each such applicator 14 is used to apply treatment liquid, such as an herbicide, to pest vegetation growing above crop vegetation. In the second mode, each applicator 14 is used for applying treatment liquid through spraying directly to and inside foliage of crop vegetation.

For purposes of securement preferably to a hitch-equipped tractor, the new apparatus 13 comprises an upright frame designated generally 29 having three points of attachment, 31, and 33,33', in the form of transverse pins which are adapted to be engaged to corresponding ones of the hooks 19, and 21,21', of the hitch. Secured to the upright frame 29 are horizontal frame members 35,35' which extend rearwardly therefrom and have a transverse supporting frame member or boom 37 extending rearwardly thereacross. Boom 37 is of sufficient length to extend transversely across a plurality (preferably six in number) of rows of vegetation. Spacedly affixed to boom 37 are a plurality of vegetation treatment assemblies **39*a* to 39*f*, each of identical configuration, each including an applicator 14**.

Referring to FIG. 4, two such assemblies **39*e*,39*f*, are illustrated. Each applicator 14 comprises a wig-like member 41, referred to herein as a wig, of flexible, absorbent textile material adapted for physically contacting target vegetation and adjustably affixed to boom 37 by securement assemblies or so-called carriers as indicated generally at 43, which are selectively positionable along boom 37** for positioning of the wigs with respect to the target vegetation in the rows. The carriers are configured for causing the respective wigs each to open forwardly in shroud-like configuration for receiving and partly surrounding foliage of target vegetation and for subsequently contacting the foliage as the tractor travels along the rows.

Each assembly includes a spray head designated generally at 45 for spraying a treatment liquid toward the respective wig for application to the foliage of the target vegetation. A large volume tank 47 mounted above frame members 35,35' contains a large supply of the treatment liquid which is delivered to the individual spray heads 45 in a manner which is specifically described hereinbelow.

Wig 41 is constituted by numerous downwardly hanging mop-like strands of absorbent textile material, preferably cotton, which are sewed to and depend from a loop 49 of canvas or other closely woven, heavy fabric fitted on an elongated, curvilinear length of rod 51 extending horizontally rearward from the respective carrier whereby the wig is caused to provide a requisite forwardly opening recess 52 for receiving target vegetation as the applicator moves forwardly upon a vehicle or other implement, such as tractor 17.

Although member 41 is referred to as a "wig," such term is not intended to limit the scope of the invention as it is conceivable that the wigs may be of textile material other than cotton strands, but which is, in any case, of a flexible nature which, when engaging foliage of target vegetation, is drapeable over the foliage without damage to either the foliage or wig to rub treatment liquid on the foliage.

Each wig may have one or more flexible bands, such as those indicated at 53,53'; which are of textile material sewed to the strands of the wig below loop 49 for cohesively tying the strands together at intervals, whereby the wig acquires more the character of a curtain to cause the strands to more cohesively drape over foliage of target vegetation, even though the ends 54 of the strands are nevertheless permited to remain free for parting upon engagement of foliage of the target vegetation. But it is also apparent that the strands are not tied to one another between bands 53,53' and above band 53' and thus, in the region between the bands and intermediate loop 49 and band 53, may be parted upon contact of vegetation for softly surrounding foliage of the target vegetation for uniformly applying treatment fluid thereto. Additional bands may be stitched around the periphery of each wig at higher or lower locations for imparting to the wig an even more cohesive character dependent upon the type of foliage to be treated, or only one band, e.g., at the level of band 53, may be utilized. Moreover, use of the wigs without any such bands is also possible, but use of at least one band is preferred for agricultural application of treatment liquids to most kinds of vegetation.

For the purpose of positioning of the wigs in spaced relationship corresponding to the spacing of rows of vegetation over which boom 37 is adapted to extend during use of the applicator, the carriers 43 are selectively slideable along boom 37 which is of angle stock, having a horizontal web 55 and an upstanding vertical web 57. Clampingly engaged to this L-shaped beam are the carriers, each having an angular bracket member as illustrated representatively at **59*b* (see FIG. 3**) and to which the respective curvilinear support rod 51 is secured, as by weldment of a linear portion 61 thereof. Each such bracket has bolted to it an upstanding clamping member 63 having a lip 65 extending across the upper edge of web 57 and secured to the L-shaped bracket 59 by a bolt 67 and nut 67 whereby, when the bolt and nut are tightened, the respective carrier 43 is securely affixed to the beam in the desired position. Also, if desired, the wigs are each aligned with respective rows of vegetation, e.g., soybeans, etc.

Extending downwardly from the straight portion 61 of the support rod is an angled extension which is bent to provide a horizontal portion 71 thereof preferably having a tip 73 which is turned slightly upwardly for purposes presently appearing.

The horizontally extending extension 71 is seen to be forward of the curvilinear support rod 51 and is optionally utilized for supporting thereon an apron 75 which preferably also is constituted of numerous strands of cotton material to provide a wig-like character similar to that of the wigs shown at 41. Each vegetation treatment assembly 39a,39b, etc., may optionally have such as apron 75. The strands of the apron hang downwardly from a loop 77 of fabric which is hooked over the respective horizontal rod extension 71 being there retained by the up-turned tip 73 of the extension and, further, preferably secured in place by being tied as indicated at 79 by ties secured to fabric loop 77. The fabric loop 49 which is fitted over support rod 51 similarly may be tied, as indicated at 81 as by having tie strings passed through a small washer 83 welded to the rod near the upper horizontal portion 61 thereof. A band 85 of textile material may preferably be sewed across the width of the apron near the lower part thereof for interengaging the individual strands of cotton, but such band may be double-stitched to provide a tubular casing 87 through which a metal rod 89 may be fitted for imparting to the apron a weighted character.

The purpose of the apron is to contact foliage of target vegetation before it passes into the respective recess 52 of each wig causing foliage of the target vegetation to be parted, as well as causing the vegetation to be bent over, permitting spray to be applied directly to the foliage which has been parted by the apron while, at the same time, the spray is closely confined within the recess bounded by the wig and apron. When the vegetation is no longer contacted by the apron 28, it is caused to slap against the respective wig 39a,39b, etc., as described more fully hereinbelow.

Said aprons are used with each assembly 39a,39b, etc. when the apparatus is to be configured for its mode of use wherein each applicator 14 applies treatment liquid directly to and inside the foliage of crop vegetation and wherein a spray nozzle arrangement described hereinbelow sprays the foliage which has been parted by the apron and the respective wig 41 then rubs the treatment liquid over the sprayed foliage by gentle, draping action.

When the apparatus is to be used in its other mode of use, namely where treatment liquid, as in the form of a potent herbicide, is to be applied directly to foliage of pest vegetation which is growing above a crop, but wherein it is intended and desired that none of the liquid be applied to the crop vegetation, each applicator 14 is configured differently to prevent liquid from dripping or being sprayed downwardly on the crop vegetation. For this purpose, there is secured to horizontal rod extension a so-called bib 91 of absorbent textile material.

Each such bib is located under the spray head 45 which is seen to constitute a fitting 97 (see FIG. 7) having an individually directable spray nozzle 99 on one side of the fitting which may be oriented in a desired position by tightening screw heads 101 on opposite sides.

Referring to FIGS. 4 and 6, bib 91 is constituted by numerous strands of absorbent textile material, preferably cotton, which are suspended from a sewn loop 93 fitted over carrier rod 71 and with the other ends of the strands being secured by stitching to fabric band 53 which is stitched around the periphery of the respective wig proximate the lower ends 54 of the cotton strands. Bib 91 thus forms a wig-like loop or swag suspended beneath the spray nozzle 99 whereby any drippage or spray from the nozzle will not be permitted to fall below bib 91. As is apparent, the bib thus extends downwardly and rearwardly from the carrier rod 71 in a configuration for contacting target vegetation prior to wig strands 54. The width of bib 91 is preferably substantially the same as the horizontal portion of the carrier rod 71.

When the apparatus is used in its mode for applying liquid to pest vegetation above a crop, it is preferred that the spray be intermittent, as more fully described hereinbelow. With intermittent spraying, there is the possibility that liquid which remains in the lines to each spray head 99 would, when the liquid pressure is cut off, tend to flow through the lines and cause drippage or residual flow of the liquid from the spray heads. This would fall upon crop foliage with possible dire consequences, such as killing of crop plants, the the absence of bib 91.

However, due to the absorbent nature of bib 91, such drippage or leakage is received and absorbed by the bib and is not permitted to fall to the ground where it could contact non-target vegetation. Also, for environmental reasons and to minimize the distribution of treatment liquid (which may be of a toxic or other dangerous character), the use of bibs prevents the same from indiscriminately falling to the ground or being applied to areas where its presence would be deleterious.

For the purpose of securement of each spray head 45 to the respective carrier 43, each tee fitting 97 extends through an aperture in bracket member 59 and is connected on the reverse side with a further tee fitting 103 permitting connection of a fluid conduit 105 to either end thereof for supplying treatment fluid to the spray nozzles, or for being tapped as indicated at 107 if the fitting 103 is that of a vegetation treatment assembly such as those designated 39a and 39f at the remote ends of boom 37.

The manner of connection of the fluid conduit 105 for supply treatment liquid to the spray nozzles is later described. However, it is believed first more helpful to describe in detail various other structural members of the apparatus, which members are all preferably of steel.

Upright frame 29 is constituted by a pair of vertical legs 109,109', each of angle stock having a relatively heavy channel-section transverse, or lateral, members 111,113 respectively bridging their upper extremities and lower regions. Short lengths of circular section rod extending outwardly from legs 109,109' constitute hoist securement points 33,33'.

Extending vertically between lateral members 111,113 are a pair of spaced apart channel section members 115,115', their respective channels being outwardly oriented to provide a vertical space 117 between members 115,155' which are each apertured as indicated at 116 proximate their upper ends to permit a steel pin or bolt 121 to be secured between these members for constituting upper hitch securement point 31. The vertical space 117 receives the upper hitch hook of a conventional tractor-mounted three-point quick hitch, permitting rapid mutual alignment of the tractor and new applicator.

Each of horizontal frame members 35,35' extends rearwardly from an opposite end of lateral member 111, preferably secured by welding, and being respectively braced to leg members 109,109' by L-section braces 119,119'. Members 35,35' are bridged at their hitch-remote ends by a channel section transverse frame member 120.

Boom 37 is carried across the hitch-remote ends of members 35,35' such that horizontal, as well as forward and rearward alignment with respect to frame members 35,35', is permitted. More specifically, L-section brackets 121,121', each having a plurality of vertically spaced apertures 123, permit the height of boom 37 to be established by bolting of the latter, as shown at 125, to brackets 121,121' through the desired aperture.

Thus, boom 37 may even be tilted if desired for proper alignment with respect to the tractor hitch. Further, a short channel-section, horizontal members 127,127' are adapted to be bolted, as at 129,129', to the respective horizontal frame members 35,35' again through one of a number of horizontally spaced apertures in the respective frame members 35,35' to permit desired fore-and-aft movement for transverse alignment of boom 37.

Tank 47, which may hold several hundreds of gallons of treatment liquid and preferably is of molded fiberglass, is mounted by means of tank saddles 131,133 in the form of steel bands which are supported by L-section legs 135,137 which extend upwardly from frame members 111,120. Straps 139,141 clamp tank 47 in the saddle.

To permit the new applicator to stand stably and in a self-supported manner when not connected to a tractor hitch, frame legs 109,109' are each provided with respective sleeves 143,143' for receiving pedestal feed 145,145', which may be pinned or bolted in place, or the sleeves may be threaded for receiving threaded portions of the feed, etc. Similarly, frame member 120 is provided with a socket 147 for receiving a removable tubular leg 149 also provided with a foot 151. Thus, a tripod support for the applicator results.

Figure 11:
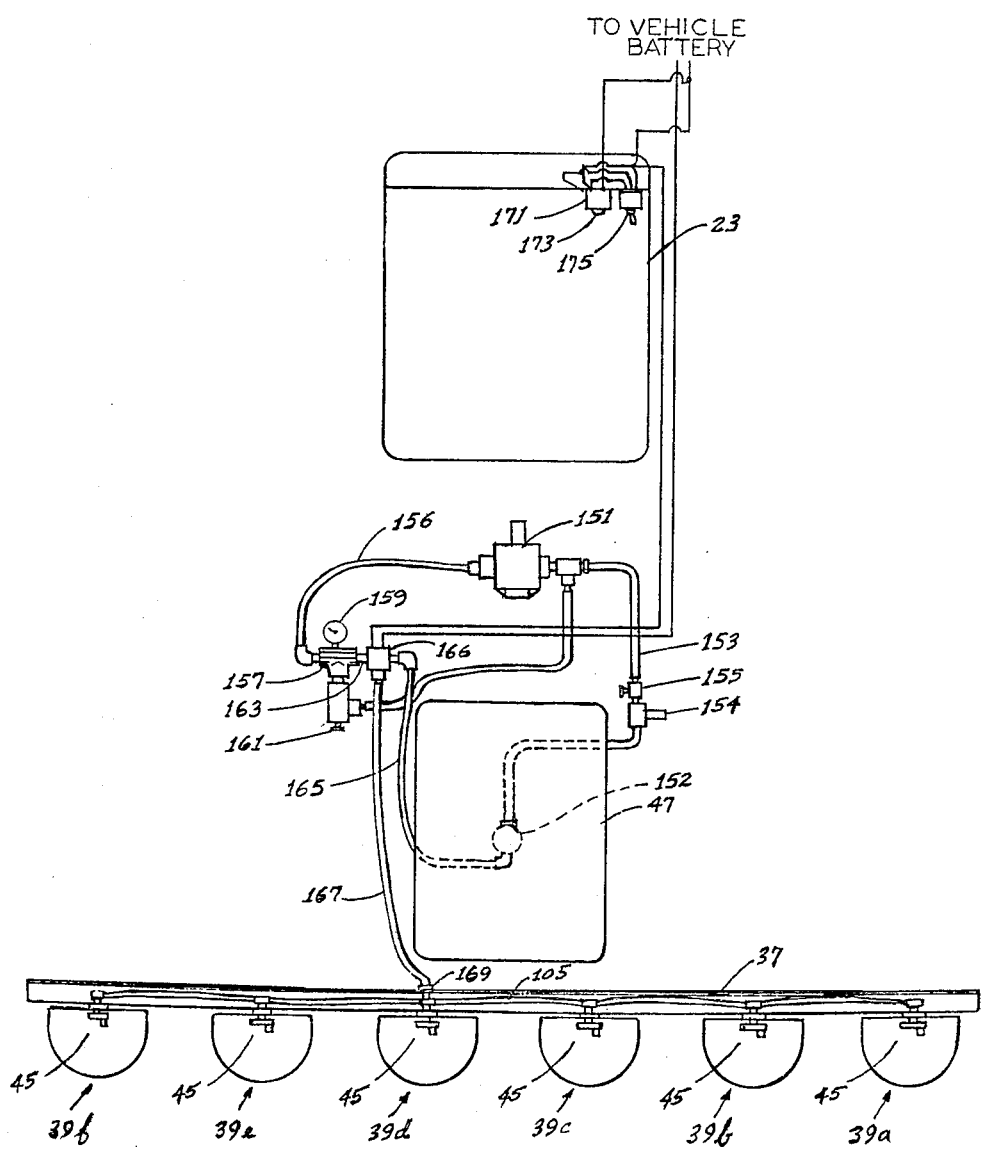
FIG. 11 is a partly pictorial, partly schematic plan view of apparatus and circuitry for distribution of agricultural treatment substances from a central supply to a plurality of vegetation treatment assemblies of the new applicator.

Referring to FIG. 11, apparatus and circuitry for controlling the distribution of treatment liquid includes a pump 151 of the positive displacement type suitably driven in an entirely conventional manner from the power take-off of a tractor 17 carrying the new applicator. Pump 151 draws treatment liquid from a sump 152 of tank 47 through a fluid conduit 153 including a strainer 154 and gate valve 155. The pump supplies such fluid under pressure through a flexible fluid conduit 156 to a commercially available pressure regulator 157. The latter has a pressure gauge 159 and a pressure adjustment control 161. An outlet 163 supplies the fluid at the regulated pressure. A bypass conduit 164 interconnects the regulator and pump inlet. A conduit 165 connecting to the tank provides for return flow of the pumped treatment liquid for agitation if such liquid is not permitted to flow through outlet 163.

An electrically actuatable solenoid valve 166 when energized connects outlet 163 to a flexible spray nozzle supply conduit 167, but when not energized connects outlet 163 to conduit 165. Conduit 167 is interconnected by a fitting 169 with conduit 105 carried along the length of boom 37. Thus, pump 151 will provide positive pumping of the treatment liquid under pressure for application by the treatment assemblies 39a–39f in a spray nozzle head 45 when solenoid valve 166 is electrically energized.

Valve 166 may be either periodically energized, for periodic spraying by heads 45, or may be continuous, for steady, constant pressure spraying by heads 45. A timer 171 of commercially designed type is provided within tractor cab 23 for controlling the rate of periodic spraying in accordance with the operator's setting of a control 173. For example, timer 171 may provide for energization of valve 166, for example, of a period of one second followed by a period of de-energization selectively variable between one second and thirty seconds. Control 173 provides selective determination of such period. A single pole, double throw switch 175 is interconnected with timer 171 for switching the timer on and off, and also is adapted to selectively provide continuous energization of valve 166 from the vehicle battery by circuit leads 177 interconnected with the solenoid winding of valve 166. More specifically, switch 175 in one position supplies the battery voltage to timer 171 for operation thereof to provide intermittent energization of solenoid valve 166. In another position, the battery voltage is provided continuously to solenoid valve 166 for continuous spraying and in a further or neutral position, the battery voltage is supplied to neither, whereby spraying of any kind is discontinued.

Referring to FIG. 7, support rod 51 for holding wig 41, in extending rearwardly from support rod linear portion 61, lies in a horizontal plane and may define a semicircle whereby the curvature of wig 41 provides a forwardly opening recess 52 which is shaped correspondingly to the semicircular curvature of rod 51. However, an alternative configuration as illustrated in FIG. 8 may be utilized wherein support rod 51 may have two portions 51a,51b, again in a horizontal plane, but which are each angled with respect to the direction of forward travel of the apparatus, as indicated by an arrow 179, whereby the wig 41 is caused to have corresponding angularly convergent portions 41a,41b and recess 52 and then of a vee configuration. There are advantages to be seen in both configurations dependent upon the type of crop used and degree to which foliage is to be contacted by portions of the wig. In addition, there may be a desire to utilize an angled configuration of the support rod 51 for ease of manufacture. But, in any event, it is not desired that the converging portions 51a,51b of the configuration shown in FIG. 8 provide a sharp bend of apex but rather one of slight curvature, as illustrated at 181, e.g., of about one-half inch or one inch radius.

Figure 9:
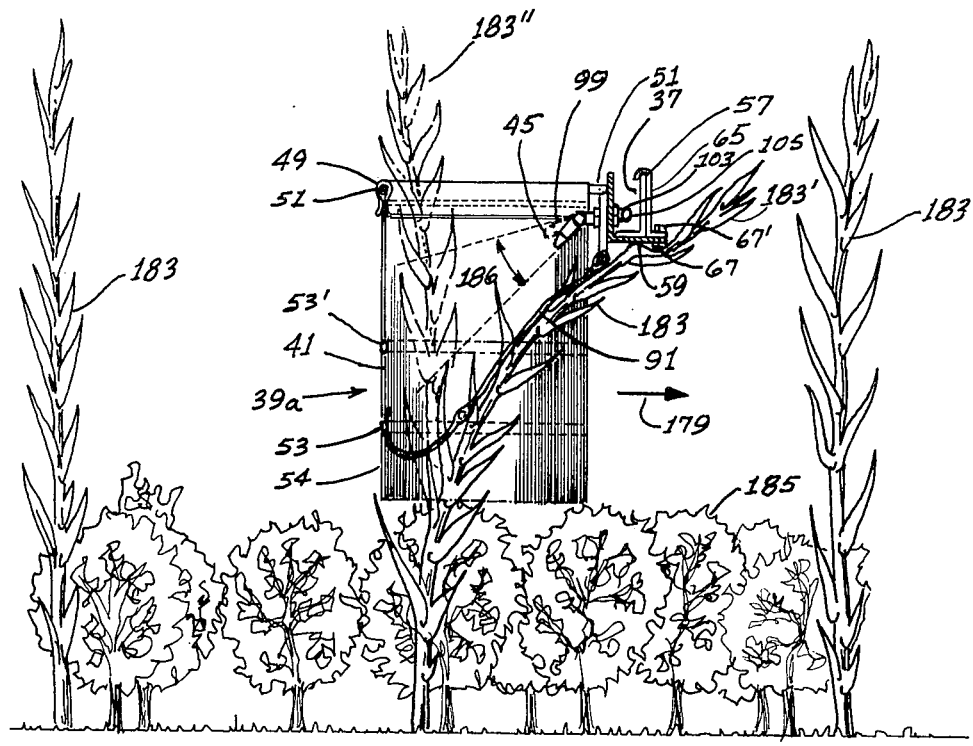
FIG. 9 is a pictorial illustration in the nature of a side view of vegetation treatment assembly of the new applicator as the same is utilized for contacting target vegetation.

The manner of usage of the new applicator in its first mode is illustrated by FIG. 9 where volunteer corn plants 183 are shown growing above a row of soybeans 185 and represent so-called pest vegetation which it is desired to kill by applying herbicide thereto. For this purpose, boom 37 of the new applicator is adjusted to cause the lower edge 54 of wig 41 of a treatment assembly 39a to pass just above the top of the soybean foliage. In such configuration, pest vegetation such as the volunteer corn 183 is contacted as the apparatus moves in the direction indicated by an arrow 179. In this configuration, a parting apron (of the configuration illustrated in FIG. 4 at 75) is not utilized and a spray head 45 has its nozzles, as illustrated at 99, oriented for spraying within an included angle designated 186 on a periodic basis whereby the absorbent textile strands of wig 41 are maintained in a wetted condition. Furthermore, each of assemblies 39a-39f is configured with a bib 91 to prevent herbicide from falling from spray head 45 onto the crop vegetation.

Under these circumstances, only foliage of pest vegetation higher than the tops of the soybean foliage is contacted by the wig 41 as well as by the bib 91. Even in the case of tall corn, as illustrated, such is deflected downwardly (e.g., that plant indicated at 183') whereby the same is caused to be bent over and with liquid thoroughly rubbed across the plant tissue surfaces by first the bib and then the trailing edges of the wig. The plant then slaps upwardly to the position illustrated at 183" when the plant is clear of the applicator boom 37. As the wig moves forward, it gently drapes over and enshrouds the pest vegetation to physically rub the herbicide or other treatment liquid across the tissues of the pest foliage. As it rubs across the foliage, the wig is deflected rearwardly to pass across the pest vegetation leaving the pest plant standing upright without having been physically damaged, it being sufficient merely to have rubbed the herbicide or other treatment liquid on the pest vegetation foliage. The same is then effectively killed, by absorption into tissues and migration to root structures, without having caused any substantial amount of the treatment's substance to have been applied to the non-pest soybean foliage 185.

It is noted that the pest vegetation physically contacts the bib first, causing the bib to be forced upwardly as illustrated at 91' for causing a squeezing effect which effectively squeezes the treatment liquid out at a point 187 for direct application to the pest vegetation foliage.

Of course, if there is no crop vegetation below the pest vegetation, the apparatus as configured in FIG. 9 may be used.

Figure 10:
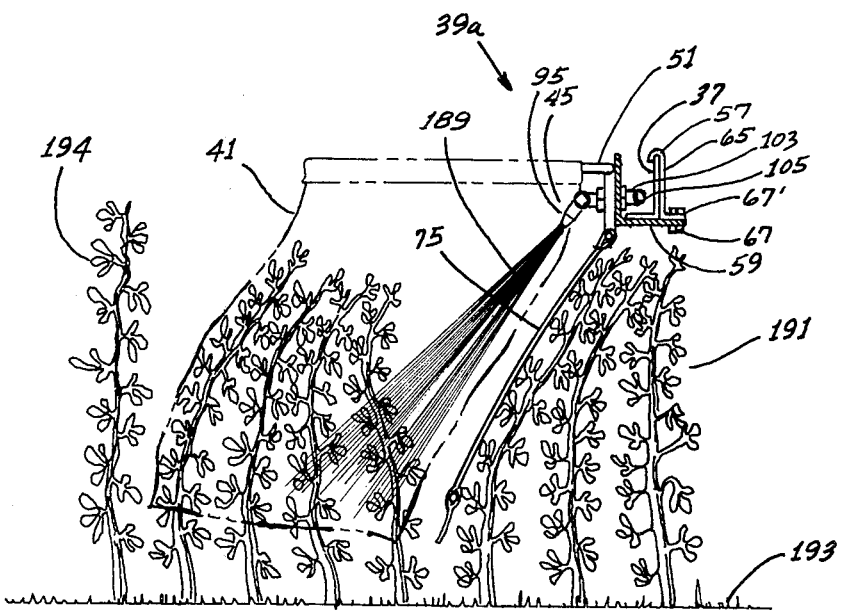
FIG. 10 is a view similar to FIG. 9 illustrating application of an agricultural treatment substance to target vegetation where foliage of the vegetation has been parted by a certain apron of the treatment assembly.

In its second mode of use, as illustrated in FIG. 10, the new applicator is utilized also for supplying treatment substance such as foliar feed, insecticides, fungicides, etc. by direct spraying on and into the foliage of crop vegetation and with each wig rubbing the same upon the plant tissues.

In this mode of use, a constant spray of treatment liquid is directed by spray nozzle 95 as a continuous spray 189 while vegetation such as that illustrated at 191 is enshrouded by wig 41. In this mode, boom 37 is lowered to cause the lower edge of the wig 41 to be above ground level 193 but for contacting the vegetation and a parting apron 75 of the invention is secured to the treatment assembly 39a whereby foliage of the vegetation to be treated is parted quite effectively by the weight of the parting apron and allowing the spray 189 to be applied to the undersurfaces and directly into the opened plant foliage. This effectively entraps the treatment liquid within the foliage after the wig 41 has passed over such foliage and, by draping gently across the foliage, the treatment liquid is further rubbed by the wig because of its wetted condition across the surfaces of the foliage of the vegetation undergoing treatment. Following passage of the treatment assembly 39a, the vegetation as represented by that plant indicated at 194, remains upright and is in no way damaged by having been contacted by the gentle draping action of wig 41, but nevertheless remains in a thoroughly treated condition, as for the purpose of applying foliar feed, etc.

Because the vegetation is confined during spraying as well as being opened or parted whereby liquid spray may be introduced directly into, and trapped within, the plant foliage, spray pressure is far less than otherwise is necessarily used for conventional crop sprayers. Thus, there is far less tendency for so-called boiling off of spray from the vegetation.

Because the wig and apron actually surround the vegetation as it is sprayed, boiling off of the spray from the back is substantially reduced if not entirely eliminated thereby reducing drift of the spray during application in distinct contrast with the usual boiling off and drift during spray applications utilizing prior art applicators. The wigs of the new applicator intercept any spray that may be boiling off vegetation and wipe it back onto the target vegetation foliage. Consequently, wastage of less treatment liquid is avoided by the new apparatus. Since lesser quantities of expensive treatment liquid is used, the user enjoys a significant economic benefit.

The present applicator may also be utilized in a conventional mode by removing wigs 41 and thus serves an all-purpose character while preserving its inherent advantages when utilized as representatively illustrated in FIGS. 9 and 10. Use of wigs as contemplated by the present invention allows an extremely targeted application of treatment substances of the liquid type and conceivably also with powder applications, but more preferably liquid, whereby the number of applications of the treatment liquid to a crop of vegetation may be substantially reduced. Moreover, the constant pressure method of distribution of the treatment liquid to the spray heads 45 by the system illustrated in FIG. 11 allows uniform rate of application, whereby the number of gallons per acre applied may be quite precisely controlled. When liquid is applied to plant vegetation by being intermittently sprayed on the wigs under the control timer 71, the preselected spray interval is selected by the timer in accordance with the density of the various pests to be controlled by the new applicator as field conditions and selective determination of the user may warrant.

Therefore, the new apparatus allows one to apply a treatment substance on crops not only where it is wanted, but also when it is wanted with high precision and accuracy to a degree heretofore unachievable in modern agriculture.

Accordingly, it will be seen that several objects of the invention are attained and various other advantages also result.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What I claim and desire to secure by Letters Patent is:

1. Apparatus for selectively applying an agricultural treatment liquid to target vegetation comprising a structure adapted for being carried by an agricultural implement, a plurality of applicators of flexible textile material, said applicators each comprising a wig of absorbent textile material configured to provide a forwardly opening recess for receiving and at least partly surrounding foliage of said target vegetation and for contacting foliage of said target vegetation without damage, constituted by means for spraying said treatment liquid toward the foliage of target vegetation within said recess, and apron means associated with each said wig for parting foliage of said target vegetation as said target vegetation passes into said recess for spraying, said apron means comprising a further wig of textile material, means securing said applicators to said support structure in spaced relationship for contacting target vegetation in rows during travel of said implement along said rows, and means for providing a supply of said treatment liquid for application to said target vegetation.

2. Apparatus according to claim 1, said wig having a plurality of textile elements individually engageable with and drapable over foliage of said target vegetation, said elements being adapted for rubbing over surfaces of said foliage to cause said treatment liquid to be rubbed on said foliage.

3. Apparatus according to claim 2, said textile elements being constituted by numerous strands of absorbent textile material, said strands parting at least over a portion of their length upon engagement of foliage of said target vegetation.

4. Apparatus according to claim 3, said strands being of cotton.

5. Apparatus according to claim 3, said strands being interengaged by at least one flexible band of textile material for cohesively tying said strands together.

6. Apparatus according to claim 1, said spraying means being configured for spraying rearwardly toward said recess.

7. Apparatus for selectively applying a treatment liquid to rows of vegetation comprising a structure being adapted for being carried by a vehicle along said rows, a plurality of applicators of absorbent textile material carried by said structure for contacting target vegetation in said rows during travel of said vehicle, means for wetting of said applicators of textile material with said treatment liquid means for directing a spray of said treatment liquid toward said applicators, said applicators of textile material being suspended in a recess-defining configuration for at least partly surrounding and subsequently contacting said target vegetation upon movement of said vehicle to apply said treatment liquid to surfaces of said target vegetation, and means for storing a supply of treatment liquid, said means for spraying said treatment liquid comprising a plurality of spray nozzles, pump means for pumping treatment liquid from said supply to provide a source of treatment liquid under pressure, selectively actuatable valve means for connecting said source of treatment liquid under pressure to said spray nozzles, and timer means for periodically actuating said valve means to intermittently cause said liquid under pressure to be sprayed by said nozzles for periodic spraying of said applicators for predetermined spray time intervals, said timer means being controllable for preselecting the periodicity of said periodic spraying.

8. Apparatus according to claim 7, said plurality of applicators being grouped in the form of individually suspended shroud-like wigs each defining a forwardly opening recess for receiving foliage of said target vegetation, said wigs being individually engageable and drapeable over said foliage for rubbing said treatment liquid over said foliage.

9. Apparatus according to claim 8, each of said wigs being constituted by numerous downwardly hanging strands each of absorbent textile material.

10. Apparatus according to claim 9, said strands being of cotton.

11. Apparatus according to claim 8 and further comprising apron means associated with each said wig for parting foliage of said target vegetation as said target vegetation passes into said recess.

12. Apparatus according to claim 11, said apron means comprising a further wig constituted by a plurality of downwardly hanging strands of absorbent textile material.

13. Apparatus for selectively applying an agricultural treatment liquid to target vegetation comprising a structure adapted for being carried by an agricultural implement, a plurality of applicators of flexible textile material, means securing said applicators to said support structure in spaced relationship for contacting target vegetation in rows during travel of said implement along said rows, said support structure comprising at least one boom extending transversely across a plurality of spaced rows of vegetation, a plurality of carriers adjustably affixed to said boom and selectively slideable along said boom for selectively transversely positioning said wigs whereby said spaced relationship of said applicators corresponds to the spacing of said rows, and means for providing a supply of said treatment liquid for application to said target vegetation, said applicators each comprising a wig formed of a plurality of elements of absorbent textile material, said carriers each comprising an elongated support member, said textile elements hanging downwardly therefrom, each said support member being configured to cause the respective wig to define a forwardly opening recess for receiving foliage of said target vegetation for at least partly surrounding and subsequently contacting surfaces of said target vegetation.

14. Apparatus according to claim 13 and further comprising at least one apron positioned for contacting foliage of said target vegetation as it passes into said recesses.

15. Apparatus according to claim 14, said means for providing treatment liquid comprising means for directing a spray of said treatment liquid rearwardly of said apron toward the respective recesses defined by said wigs.

16. Apparatus according to claim 15, said means for directing a spray comprising means for periodically spraying said wigs, absorbent textile material of said wigs being wetted with said treatment liquid by said spraying, said textile material upon contacting said foliage rubbing said treatment liquid on said foliage.

17. Apparatus according to claim 16, said apron upon contacting said target vegetation causing it to be bent over whereupon when ceasing to be contacted by said apron, said target vegetation is caused to slap against said wetted wigs.

18. Apparatus according to claim 13, said apron comprising a plurality of parting wigs corresponding to the first said wigs, each said parting wig being also formed of a plurality of elements of absorbent textile material and each carried by a corresponding one of said carriers forwardly of the respective recesses formed by the first said wigs.

19. Apparatus according to claim 13, each of said carriers comprising a clamp for clampingly engaging said boom.

20. Apparatus according to claim 19, each said elongated support member comprising a rod carried by said clamp for being slideably affixed to said boom, said rod extending rearwardly from said clamp in recess defining configuration, said wig having a loop of textile material at the upper end of said wig, said loop carrying said textile elements, said loop being fitted over said rod.

21. Apparatus according to claim 20, said rod lying in a horizontal plane, and having a curved portion defining a curve opening forwardly for causing said wig to have corresponding forwardly opening curvature.

22. Apparatus according to claim 20, said rod lying in a horizontal plane and having first and second portions each angled with respect to the direction of travel of said apparatus providing a forwardly opening vee configuration for causing said wig to have corresponding angularly convergent portions.

23. Apparatus according to claim 13, said means for providing treatment liquid comprising a plurality of spray nozzles, there being at least one spray nozzle associated with each of said wigs for spraying said treatment liquid toward the respective wig.

24. Apparatus according to claim 23, said spray nozzles being affixed to said carriers for movement therewith along said boom.

25. Apparatus according to claim 24 and further comprising means for supplying said treatment liquid to said spray nozzles intermittently under pressure for periodic spraying of said wigs for spray time intervals of predetermined length.

26. Apparatus according to claim 23 and further comprising bib means supported in proximity to each wig for catching drippage of liquid from said spray nozzles, said bib means comprising an area of flexible absorbent textile material disposed in a swag below each of said spray nozzles.

27. Apparatus according to claim 13 and further comprising means for lifting said boom to a height for positioning each of said wigs a predetermined distance above ground for contacting only target vegetation, said wigs when at said predetermined distance above ground providing ground clearance for avoiding contact of non-target vegetation.

28. Apparatus according to claim 13, said means for providing treatment liquid comprising at least one nozzle associated with ech of said wigs, said apparatus further comprising bib means supported from each of said wig carriers for catching drippage of liquid from said nozzles, said bib means defining a predetermined area of absorbent textile material having a drip-catching configuration below each of said nozzles.

29. Apparatus according to claim 28, said bib means each being constituted by numerous strands of absorbent textile material interengaging the respective wig and carrier, said bib strands being secured at one end from said wig carrier and being secured at the other end to the respective wig to define a wig-like swag suspended beneath the respective nozzles.

30. Apparatus according to claim 29, said bibs each extending downwardly and rearwardly from the respective carrier to the respective wig in a configuration for contacting target vegetation prior to the respective wig.

* * * * *